(No Model.) 2 Sheets—Sheet 2.
J. W. CLEARY.
VEHICLE.
No. 527,666. Patented Oct. 16, 1894.
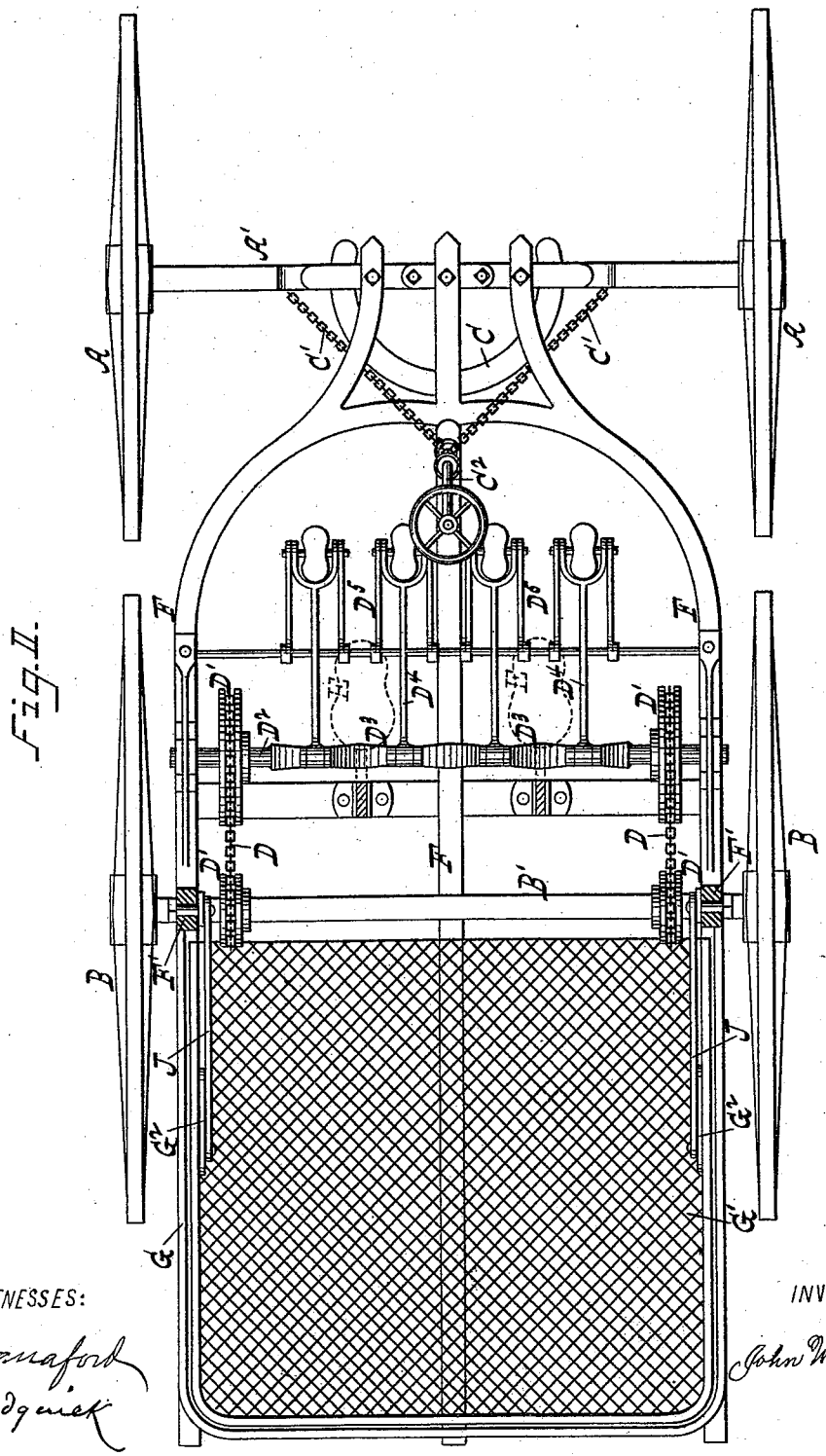
Fig. II.
WITNESSES:
F. W. Hanaford
C. Sedgwick
INVENTOR
John W. Cleary

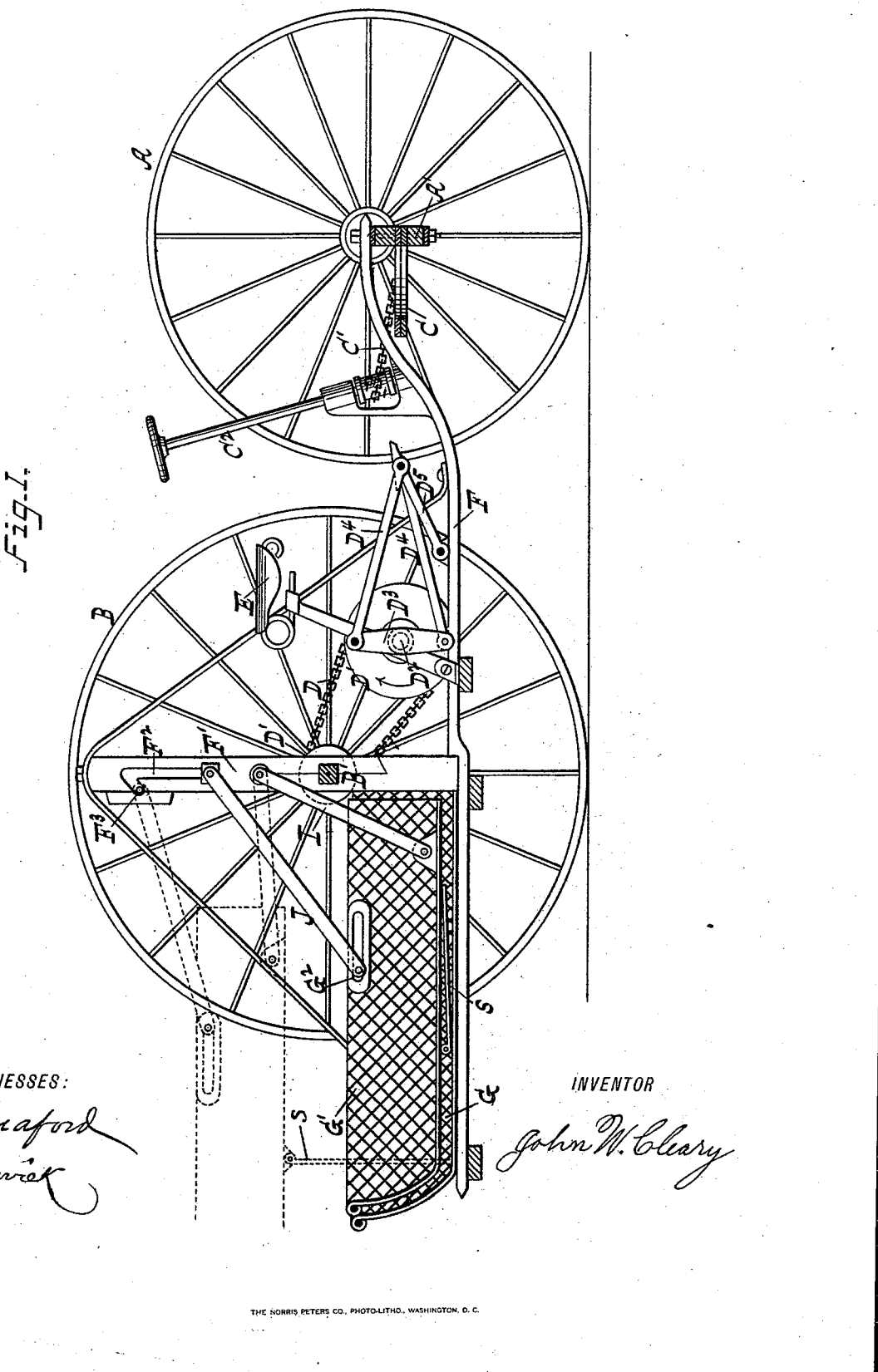

UNITED STATES PATENT OFFICE.

JOHN W. CLEARY, OF BROOKLYN, NEW YORK.

VEHICLE.

SPECIFICATION forming part of Letters Patent No. 527,666, dated October 16, 1894.

Application filed December 20, 1893. Serial No. 494,166. (No model.)

*To all whom it may concern:*

Be it known that I, JOHN W. CLEARY, of Brooklyn, in the county of Kings and State of New York, have invented a new and Improved Vehicle, of which the following is a full, clear, and exact description.

My invention relates to improvements in light vehicles, especially such as are adapted to be propelled by foot power or by light motors; and the object of my invention is to combine with the vehicle a package carrier which makes the vehicle well adapted for the uses of tradesmen in delivering goods, also to construct and arrange the package carrier so that it is easy of access and may be conveniently arranged to carry a comparatively large amount of goods.

A further object of my invention is to arrange the package carrier behind the rear axle, so as to leave the central portion of the vehicle free for the riders and the propelling mechanism, and to arrange the package carrier in two or more parts which are adapted to carry goods, but which may be nested when the carrier is not in use.

To these ends my invention consists of certain features of construction and combinations of parts, which will be hereinafter described and claimed.

Reference is to be had to the accompanying drawings, forming a part of this specification, in which similar letters of reference indicate corresponding parts in both views.

Figure 1 is a longitudinal section of the vehicle embodying my invention; and Fig. 2 is a plan view of the same.

The vehicle, as illustrated, is provided with four wheels, but a tricycle may be used without departing from the principle of my invention, as this relates exclusively to the arrangement of the package carrier to be hereinafter described, without regard to the particular construction of the vehicle body and the arrangement of its wheels or propelling mechanism.

The vehicle shown has two front wheels A, which are journaled on an axle A' in the usual manner, and the rear wheels B are carried by an axle B', the two axles supporting the vehicle body, as described below. The front axle is provided with a common form of fifth-wheel C, and it connects by means of chains C', which are secured to it on opposite sides of the center, with a nearly vertical but slightly rearwardly ranging shaft $C^2$, which turns in suitable bearings and which acts as a steering shaft, having at its top a hand wheel by means of which it may be turned; and it will be readily seen that by turning the shaft to the right or left, the chains C' may be wound thereon and the front axle turned so as to give the desired direction to the moving vehicle.

The rear axle is revolved by means of chains D, running over sprocket wheels D', on the axle B' and on a crank shaft $D^2$, which is journaled on the frame of the vehicle, parallel with the axle, as shown clearly in Fig. 2, the chains and sprocket wheels being arranged preferably near the ends of the axle and crank shaft so as to be, as much as possible, out of the way. The crank shaft $D^2$ is provided with cranks $D^3$, which connect by means of pitmen $D^4$, with pedals or foot levers $D^5$, these being fulcrumed on the body of the vehicle at points where they may be easily reached from the seats E, which may be of any desired construction and are supported in any suitable manner on the vehicle.

It will be seen, by reference to the drawings, that two seats and four pedals are used, so that two people may ride in the vehicle and use their united efforts to propel it. It will be observed in this connection that the steering shaft $C^2$ also comes within easy reach of the seats. The propelling mechanism just described provides a convenient means of moving the vehicle, but I do not claim the propelling mechanism in detail. Neither do I limit my invention to the use of this particular propelling mechanism, as any suitable means such, for instance, as an electric motor or a small steam engine, may be used for running the machine.

The bed of the machine is preferably of open construction, in order to render it as light as is consistent with the necessary strength, and the bed, as illustrated, comprises the longitudinal sills F, and suitable cross pieces connecting them. This construction is not shown or described in great detail, for the reason that any suitable bed may be provided.

On opposite sides of the vehicle are posts

F', which project upward from the axle B' and which form supports for the arms of the parcel carrier, as described presently. The parcel carrier comprises two similar parts G and G', the former being stationary and the latter movable, and it will be understood that still other parts like the movable part G' may, if desired, be provided. The lower receptacle G of the carrier rests on the bed of the vehicle behind the rear axle, so that it may be conveniently reached and the upper receptacle or compartment rests in the lower one when it is not in use, and is adapted to swing upward into the position shown by dotted lines in Fig. 1, when it is in use, and in this way the parcel carrier is made to hold a comparatively large amount of material. The receptacles of the parcel carrier are preferably of skeleton construction, as illustrated, to render them as light as possible.

The movable part G' of the carrier is supported on the posts F' with which it connects by means of arms I and J, these being arranged in pairs on opposite sides of the vehicle. The arms I are pivoted to the posts, near the center of the latter and also pivoted to the lower, inner portions of the part G', and the arms J connect with the upper inner portions of the receptacle or part G' and with the upper ends of the posts.

To provide for the movement necessary in swinging the receptacle G' up and down, the receptacle G' is slotted longitudinally, near its top edge and opposite sides, as shown at $G^2$, to receive the pivot pins at the lower ends of the arms J, and the posts F' are slotted vertically, as shown at $F^2$, to receive the pivot pins at the upper ends of the arms J, the slots $F^2$ having offsets $F^3$ in which the pivot pins may rest when the receptacle G' is swung upward, as shown in dotted lines in Fig. 1, and this arrangement enables the said receptacle to be supported in its raised position. Any other suitable means may be employed, however, to hold the receptacle in place.

To take the strain off the arms I and J, a leg S is pivoted to the under side of the receptacle G', this arrangement enabling the leg to be thrown flatwise beneath the receptacle G' when the parcel carrier is in its most compact form, as shown in Fig. 1, but when the upper receptacle G' is raised the leg swings into a vertical position, rests on the bottom of the lower compartment or receptacle at a point above one of the sills and cross bars, and thus greatly stiffens the upper receptacle.

It will be seen from the above description that the parcel carrier may be arranged in a compact form, as illustrated, and if comparatively few goods are to be delivered, they may be poured into the upper receptacle of the carrier without raising said receptacle, but if a greater number of goods are to be carried, the receptacle G' is raised, as described, and the goods to be carried may be placed in both receptacles of the carrier.

Having thus described my invention, I claim as new and desire to secure by Letters Patent—

1. The combination, with the vehicle having upwardly-extending posts on opposite sides, of a stationary parcel receptacle arranged behind the posts, an upwardly moving receptacle adapted to lie within the stationary one, a pair of arms pivoted to opposite sides of the movable receptacle and to the posts, and a second pair of arms slidably connected with the upper part of the movable receptacle and with the upper ends of the posts, substantially as described.

2. The combination with a vehicle provided with upwardly extending posts having slots near their upper ends, said slots being provided with offsets, of a stationary receptacle secured upon the frame of the machine in rear of the posts, a movable receptacle adapted to rest within the stationary receptacle and having slots in its opposite sides at the top, an arm pivoted in the slots of the posts and receptacle, and a second arm pivoted to the lower part of the said receptacle and to the posts below the slots thereof, substantially as described.

JOHN W. CLEARY.

Witnesses:
M. P. SELLECK,
JAMES MOONEY.